(12) United States Patent
Hying et al.

(10) Patent No.: US 10,566,593 B2
(45) Date of Patent: Feb. 18, 2020

(54) SEPARATOR WITH IMPROVED EASE OF HANDLING

(75) Inventors: Christian Hying, Rhede (DE); Volker Hennige, Duelmen (DE); Gerhard Hoerpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 3092 days.

(21) Appl. No.: 12/063,626

(22) PCT Filed: Jun. 6, 2006

(86) PCT No.: PCT/EP2006/062915
§ 371 (c)(1),
(2), (4) Date: Feb. 12, 2008

(87) PCT Pub. No.: WO2007/028662
PCT Pub. Date: Mar. 15, 2007

(65) Prior Publication Data
US 2010/0279173 A1    Nov. 4, 2010

(30) Foreign Application Priority Data
Sep. 5, 2005    (DE) .................. 10 2005 042 215

(51) Int. Cl.
H01M 2/14      (2006.01)
H01M 2/16      (2006.01)
H01M 10/052    (2010.01)

(52) U.S. Cl.
CPC ......... H01M 2/145 (2013.01); H01M 2/162 (2013.01); H01M 2/1646 (2013.01); H01M 2/1666 (2013.01); H01M 10/052 (2013.01); Y10T 29/4911 (2015.01)

(58) Field of Classification Search
None
See application file for complete search history.

(56) References Cited

U.S. PATENT DOCUMENTS

| | | |
|---|---|---|
| 6,299,668 B1 | 10/2001 | Penth et al. |
| 6,299,778 B1 | 10/2001 | Penth et al. |
| 6,309,545 B1 | 10/2001 | Penth et al. |
| 6,340,379 B1 | 1/2002 | Penth et al. |
| 6,383,386 B1 | 5/2002 | Hying et al. |
| 6,495,292 B1 | 12/2002 | Williams |
| 6,620,320 B1 | 9/2003 | Hying et al. |
| 6,841,075 B2 | 1/2005 | Penth et al. |
| 7,691,529 B2 | 4/2010 | Hennige et al. |
| 7,892,673 B2 | 2/2011 | Hennige et al. |
| 8,053,102 B2 | 11/2011 | Hennige et al. |
| 2002/0023419 A1 | 2/2002 | Penth et al. |
| 2002/0039648 A1 | 4/2002 | Horpel et al. |
| 2004/0028913 A1 | 2/2004 | Hennige et al. |
| 2004/0038105 A1 | 2/2004 | Hennige et al. |
| 2004/0262169 A1 | 12/2004 | Hying et al. |
| 2005/0031942 A1 | 2/2005 | Hennige et al. |
| 2005/0070193 A1 | 3/2005 | Hennige et al. |
| 2005/0084761 A1 | 4/2005 | Hennige et al. |
| 2005/0087491 A1 | 4/2005 | Hennige et al. |
| 2005/0221165 A1 | 10/2005 | Hennige et al. |
| 2005/0221192 A1 | 10/2005 | Hennige et al. |
| 2005/0255769 A1 | 11/2005 | Hennige et al. |
| 2006/0024569 A1 | 2/2006 | Hennige et al. |
| 2006/0046138 A1 | 3/2006 | Hennige et al. |
| 2006/0078791 A1 | 4/2006 | Hennige et al. |
| 2006/0166085 A1 | 7/2006 | Hennige et al. |
| 2007/0099072 A1 | 5/2007 | Hennige et al. |
| 2007/0139860 A1 | 6/2007 | Hoerpel et al. |
| 2008/0020190 A1 | 1/2008 | Nun et al. |
| 2008/0032197 A1 | 2/2008 | Horpel et al. |
| 2008/0248381 A1 | 10/2008 | Hennige et al. |
| 2009/0269489 A1 | 10/2009 | Hennige et al. |
| 2010/0000079 A1 | 1/2010 | Hörpel et al. |
| 2010/0003401 A1 | 1/2010 | Hörpel et al. |
| 2011/0206971 A1 | 8/2011 | Hennige et al. |
| 2012/0251890 A1 | 10/2012 | Pascaly et al. |
| 2012/0308871 A1 | 12/2012 | Pascaly et al. |
| 2014/0127546 A1 | 5/2014 | Pascaly et al. |

FOREIGN PATENT DOCUMENTS

| | | |
|---|---|---|
| DE | 102 38 941 | 3/2004 |
| DE | 102 38 944 | 3/2004 |
| DE | 103 47 566 | 5/2005 |
| JP | 57 095071 | 6/1982 |

(Continued)

OTHER PUBLICATIONS

U.S. Appl. No. 10/575,268, filed Apr. 11, 2006, Hennige, et al.
U.S. Appl. No. 11/578,664, filed Oct. 18, 2006, Hoerpel, et al.
U.S. Appl. No. 11/917,914, filed Dec. 18, 2007, Holzapfel, et al.
U.S. Appl. No. 12/021,436, filed Jan. 29, 2008, Pascaly, et al.
U.S. Appl. No. 12/066,146, filed Mar. 7, 2008, Schormann, et al.
U.S. Appl. No. 12/388,671, filed Feb. 19, 2009, Hennige, et al.
U.S. Appl. No. 13/266,940, filed Oct. 28, 2011, Pascaly, et al.

(Continued)

*Primary Examiner* — Helen Oi K Conley
(74) *Attorney, Agent, or Firm* — Oblon, McClelland, Maier & Neustadt, L.L.P.

(57) ABSTRACT

Robust separator, which has on a substrate and in the intermediate spaces of the substrate, which comprises fibres of an electrically nonconducting material, an electrically nonconductive coating of oxide particles which are adhesively bonded to one another and to the substrate by an inorganic adhesive and comprise at least one oxide, selected from $Al_2O_3$, $ZrO_2$ and $SiO_2$, wherein polymer particles are also present in the ceramic coating in addition to the oxide particles of $Al_2O_3$, $ZrO_2$ and/or $SiO_2$. These separators are particularly easy to handle, since they are mechanically very stable.

29 Claims, No Drawings

(56) References Cited

FOREIGN PATENT DOCUMENTS

| | | |
|---|---|---|
| JP | 6 140016 | 5/1994 |
| WO | 2004 112183 | 12/2004 |

SEPARATOR WITH IMPROVED EASE OF HANDLING

The present invention relates to a separator for an electrochemical cell, a method for the production of such a separator and an electrochemical cell which comprises such a separator.

In this description, electrochemical cell or battery is to be understood as meaning batteries and accumulators (secondary batteries) of any type, in particular alkaline, such as, for example, lithium, lithium ion, lithium polymer and alkaline earth batteries and accumulators, in particular in the form of high-energy or high-performance systems.

Electrochemical cells comprise electrodes which have opposite poles and are separated from one another by a separator while maintaining ion conductivity.

A separator is conventionally a thin, porous, electrically insulating material having high ion permeability, good mechanical strength and long-term stability to the chemicals and solvents used in the system, for example in the electrolyte of the electrochemical cell. In electrochemical cells, it is intended completely to isolate the anode from the cathode electronically. Moreover, it must have permanent elasticity and must follow the movements in the system, for example in the electrode packet during charging and discharging.

The separator decisively determines the life of the arrangement in which it is used, for example that of an electrochemical cell. The development of rechargeable electrochemical cells or batteries is therefore influenced by the development of suitable separator materials. General information about electrical separators and batteries can be obtained, for example, in J. O. Besenhard in "Handbook of Battery Materials" (VCH-Verlag, Weinheim 1999).

High-energy batteries are used in various applications in which it is important to have as large a quantity of electrical energy as possible available. This is the case, for example, in traction batteries but also for emergency power supply with batteries (auxiliary power systems). The energy density is frequently stated in weight-related [Wh/kg] or in volume-related [Wh/l] quantities. At present, energy densities of from 350 to 400 Wh/l and from 150 to 200 Wh/kg are reached in high-energy batteries. The power demanded in the case of such batteries is not so great and it is therefore possible to make compromises with regard to the internal resistance. This means that the conductivity of the electrolyte-filled separator, for example, need not be as great as in the case of high-performance batteries, thus also permitting other separator concepts.

Thus, in high-energy systems, it is also possible to use polymer electrolytes which have a very low conductivity of from 0.1 to 2 mS/cm. Such polymer electrolyte cells cannot be used as high-performance batteries.

Separator materials for use in high-energy performance battery systems must have the following properties:

They must be as thin as possible in order to ensure a small specific space requirement and in order to keep the internal resistance low. In order to ensure these low internal resistances, it is important that the separator also has high porosity. Furthermore, it must be light so that a low specific weight is achieved. Moreover, the wettability must be high, since otherwise dead zones which have not been wetted form.

In many, especially mobile applications, very large quantities of energy are required (for example in traction batteries). The batteries in these applications therefore store large quantities of energy in the fully charged state. The separator must be safe for this purpose since very large quantities of electrical energy are transported in these batteries. These energies must not be released in an uncontrolled manner in the event of malfunctioning of the battery, such as, for example, overcharging or short-circuit or in the event of an accident, since this would inevitably lead to explosion of the cell with the appearance of fire.

Currently used separators predominantly consist of porous organic polymer films or of inorganic nonwovens, such as, for example, nonwovens comprising glass or ceramic materials, or ceramic papers. These are produced by various companies. Important producers here are: Celgard, Tonen, Ube, Asahi, Binzer, Mitsubishi, Daramic and others.

The separators comprising inorganic nonwovens or comprising ceramic paper are mechanically very unstable and readily lead to short-circuits, so that it is not possible to achieve a long service life.

A typical organic separator consists, for example, of polypropylene or of a polypropylene/polyethylene/polypropylene composite. A major disadvantage of these organic polyolefin separators is their low thermal load capacity of less than 150° C. Even briefly reaching the melting point of these polymers leads to substantial melting of the separator and to a short-circuit in the electrochemical cell which uses such a separator. The use of such separators is therefore generally not safe. This is because the separators are destroyed on reaching relatively high temperatures, in particular of more than 150° C. or even 180° C.

In order to overcome these disadvantages, initial experiments were carried out to use inorganic composite materials as separators. Thus, DE 198 38 800 C1 proposes an electrical separator having a composite structure which comprises a sheet-like, flexible substrate provided with a multiplicity of orifices and having a coating present thereon. The material of the substrate is selected from metals, alloys, plastics, glass and carbon fibers or a combination of such materials, and the coating is an extensive, continuous, porous, electrically nonconductive ceramic coating. The use of the ceramic coating promises thermal and chemical stability. The separators, which have a carrier or a substrate comprising electrically conductive material (as stated in the example), have, however, proven to be unsuitable for electrochemical cells since the coating cannot be produced over a large area without defects in the thickness described. Thus, short-circuits very easily occur. Moreover, such thin metal fabrics as required for very thin separators are not commercially available.

WO 99/62624 describes ceramic membranes which can be rendered hydrophobic. A use of such membranes as separators in batteries is not described. A large number of materials, in particular metal fabrics, can be used as a substrate for the ceramic membrane, as described in DE 198 38 800.

In preceding works (DE 101 42 622), it was possible to show that it is possible to produce a separator which has a sufficiently low resistance in combination with the electrolyte and nevertheless has a sufficiently high long-term stability using a material which comprises a sheet-like, flexible substrate provided with a multiplicity of orifices and having a coating present on and in this substrate, the material of the substrate being selected from woven or nonwoven, electrically nonconductive fibers of glass or ceramic or a combination of such materials and the coating being a porous, electrically insulating, ceramic coating, and the resulting separator having a thickness of less than 100 μm and being flexible. Although the separator described in DE 101 42 622 has a very high conductivity, the separator described there still does not meet the requirements for an industrially usable separator with regard to the thickness and the weight as well as the safety.

In DE 102 08 277, the weight and the thickness of the separator was reduced by using a polymer nonwoven, but the embodiments of a separator which are described there still do not meet all requirements for a separator for a lithium high-energy battery, in particular because this application placed particular value on as large pores as possible of the separator. With the up to 5 µm particles described there, however, it is not possible to produce from 10 to 40 µm thick separators, since only a few particles would have come to lie one on top of the other in this case. The separator would therefore inevitably have a high error and defect density (e.g. holes, cracks, etc.).

Very recently, it has been possible to develop ceramic or hybrid separators which are substantially suitable for use in Li ion batteries. Such separators are described, for example, in DE 103 47 569, DE 103 47 566 or DE 103 47 567. DE 102 38 945 discloses particularly safe ceramic separators which have an additional layer of shut-down particles on the surface of the ceramic coating, the layer producing a barrier layer on the surface in the event of impermissibly great heating as a result of melting of the particles and thus preventing further ion flow.

Various techniques can be used in the production of batteries. Thus, for the production of cylindrical battery cells, separator/electrode layers are rolled up and sealed in an appropriate housing. In the case of other battery cell geometries, for example, the individual separator/electrode layers are stacked one on top of the other and are finally welded to one another. There are also laminated forms or wound prismatic cells.

In these various production methods, problems are constantly encountered as a result of the mechanical handling of the ceramic separator materials. As a result of carelessness or as a result of the production process, the ceramic separator may easily be damaged, whereby short-circuit on the battery may easily occur, for example owing to holes in the bends and/or creases in the separator.

It was therefore an object of the present invention to provide an alternative separator which preferably does not have one or more of the abovementioned disadvantages. In particular, it was intended to provide a separator which has improved handling properties and nevertheless electrochemical properties comparable with those separators known from the prior art.

Surprisingly, it was found that a separator which has, on a substrate and in the voids of the substrate, an electrically nonconductive coating comprising oxide particles adhesively bonded to one another and to the substrate is substantially more stable if the ceramic coating also contains polymer particles in addition to the oxide particles. Particularly with the occurrence of a bend or crack in the separator, this is, in the presence of polymer particles, not propagated in the ceramic coating further than the next polymer particle.

The present invention therefore relates to a separator which has, on a substrate and in the voids of the substrate, which comprises fibers of an electrically nonconductive material, a porous electrically nonconductive coating comprising oxide particles which are adhesively bonded to one another and to the substrate by an inorganic adhesive and comprise at least one oxide selected from $Al_2O_3$, $ZrO_2$ and $SiO_2$, wherein polymer particles are also present in the ceramic coating in addition to the oxide particles of $Al_2O_3$, $ZrO_2$ and/or $SiO_2$.

The present invention also relates to a method for the production of a separator according to the invention, wherein a substrate which comprises fibers of an electrically nonconductive material and voids between the fibers is provided with a ceramic coating, for which purpose a suspension is applied on and in the substrate and said suspension is solidified by heating at least once on or in the substrate, the suspension comprising a sol and at least two particle fractions suspended in the sol, the first fraction of which comprises oxide particles selected from the oxides of the elements Al, Zr and/or Si and the second fraction of which comprises polymer particles.

The present invention also relates to the use of a separator according to the invention as a separator in batteries and lithium batteries which have a separator according to the invention, and vehicles which have such batteries.

The separator according to the invention has the advantage that it has improved properties compared with commercially available ceramic separators. Thus, the separator according to the invention has improved laminatability in contact with electrodes containing polyvinylidene fluoride (PVDF). In addition, the separator according to the invention is distinguished by improved flexibility and a higher tolerance to buckling. The penetration strength too may be greater in the case of the separators according to the invention than in the case of conventional ceramic or hybrid separators.

A further advantage of the separators according to the invention is that, on cutting, substantially less ceramic dust is produced than when cutting conventional ceramic separators.

The electrochemical behavior of the separator according to the invention scarcely changes compared with the properties of a separator which comprises an equal volume fraction of oxide particles instead of the polymer particles, since the properties of the separator are determined predominantly by the pore structure. The wettability of the separator according to the invention changes substantially only in the microscopic region in the direct environment of the polymer particles. The wettability of the entire separator on the other hand remains (virtually) unchanged, so that the properties of a separator according to the invention are macroscopically (virtually) unchanged compared with the properties of a separator without polymer particles in the ceramic coating.

The method according to the invention is described by way of example below without it being intended to limit the invention thereto, the scope of protection of which is evident from the claims and the description. The claims themselves are also part of the disclosure content of the present invention. When ranges, general formulae or classes of compounds are stated below, these are intended to include not only the corresponding ranges or groups of compounds which are explicitly mentioned but also all part-ranges and part-groups of compounds which can be obtained by omitting individual values (ranges) or compounds.

The separator according to the invention, which has, on a substrate and in the voids of the substrate which comprises fibers of an electrically nonconductive material, a porous electrically nonconductive coating comprising oxide particles which are adhesively bonded to one another and to the substrate by an inorganic adhesive and comprise at least one oxide selected from $Al_2O_3$, $ZrO_2$ and $SiO_2$, is distinguished by the fact that polymer particles are also present in the ceramic coating in addition to the oxide particles of $Al_2O_3$, $ZrO_2$ and/or $SiO_2$.

Polymer particles which may be present in the separator according to the invention are, for example, particles of polymers and copolymers selected from PVDF, PP, PE and other polymers stable in lithium batteries.

The polymer particles present in the separator according to the invention preferably have a melting point which is between 100° C. and 250° C. It may therefore also be lower than the highest temperature which can be used in the production of the separator. If the polymer particles have a lower melting point, polymers which are present are preferably those which do not wet the oxide particles during the production of the membrane and preferably retain a substantially spherical shape. Wetting of the oxide particles by the polymer would lead to a separator which would have a wettability predetermined by the polymer and which would behave like a polymer separator having a high content of ceramic filler. Preferably, the polymer particles have a melting point of less than 200° C., preferably of less than 180° C. and particularly preferably of from 100 to 150° C.

The proportion of the polymer particles in the separator according to the invention is preferably so high that, in the separator, the volume fraction of the oxide particles relative to the polymer particles is from 2:1 to 100:1, preferably from 5:1 to 50:1 and particularly preferably from 10:1 to 20:1. In the production of the separator, the volume ratio can be determined from the masses of the polymer particles and oxide particles used, by calculating the volume of the individual components from the density and mass of the materials used.

The polymer particles may have a mean particle size which corresponds to from 0.1 to 30 times, preferably from 0.75 to 25 times, preferably from 0.9 to 15 times and particularly preferably from 1 to 10 times the mean particle size of the oxide particles. The mean particle size of the oxide particles is preferably from 0.1 to 10 µm, preferably from 0.5 to 5 µm and particularly preferably from 1 to 3 µm.

Very particularly preferably, the separator according to the invention comprises exclusively oxide particles and/or polymer particles which have a mean particle size which is less than 0.5 times, preferably less than 0.2 times and preferably less than 0.1 times the thickness of the separator.

The mean particle size of the oxide particles and of the polymer particles can be determined by means of small-angle laser scattering during the production of the separator. In the finished separator, the particle size of the polymer particles and of the oxide particles can be determined by viewing by means of a scanning electron microscope.

The separators according to the invention preferably have substrates which are flexible and preferably have a thickness of less than 50 µm. The flexibility of the substrate ensures that the separator according to the invention can also be flexible. Such flexible separators can then be used in particular for the production of so-called spiral-wound cells. The substrates have voids. In particular, the substrates have voids which represent pores, i.e. voids which permit passage of material from one side of the substrate to the other side in a direct or indirect line.

The thickness of the substrate has a considerable influence on the properties of the separator since both the flexibility and the surface resistance of the separator impregnated with electrolyte is dependent on the thickness of the substrate. The separator according to the invention therefore preferably has substrates which have a thickness of less than 30 µm, particularly preferably less than 20 µm. In order to be able to achieve a sufficiently high efficiency of the batteries, in particular in the case of lithium ion batteries, it has proven advantageous if the separator according to the invention has a substrate which preferably has a porosity of more than 40%, preferably from 50 to 97%, particularly preferably from 60 to 90% and very particularly preferably from 70 to 90%. The porosity is defined here as the volume of the substrate (100%) minus the volume of the fibers of the substrate, i.e. the volume fraction of the substrate which is not filled with material. The volume of the substrate can be calculated from the dimensions of the substrate. The volume of the fibers is obtained from the measured weight of the nonwoven considered and the density of the fibers. In a particularly preferred embodiment of the separator according to the invention, the substrate is a nonwoven having a mean pore size of from 5 to 500 µm, preferably from 10 to 200 µm.

The substrate may comprise, as electrically nonconductive fibers, woven or unwoven fibers of polymers, natural fibers, carbon fibers, glass fibers or ceramic fibers. The substrate preferably comprises woven or unwoven polymer fibers. Particularly preferably, the substrate comprises a woven polymer fabric or nonwoven polymer fabric or is such a woven fabric or nonwoven fabric. The substrate preferably comprises, as polymer fibers, electrically non-conductive fibers of polymers which are selected from polyacrylonitrile (PAN), polyamide (PA), polyesters, such as, for example, polyethylene terephthalate (PET), and/or polyolefin (PO), such as, for example, polypropylene (PP) or polyethylene (PE) or mixtures of such polyolefins. If the open substrate comprises polymer fibers, however, it is also possible to use polymer fibers other than the abovementioned ones, provided that they both have the thermal stability required for the production of the separators and are stable under the operating conditions in the electrochemical cell, preferably in a lithium battery. In a preferred embodiment, the separator according to the invention comprises polymer fibers which have a softening temperature of more than 100° C. and a melting point of more than 110° C.

The substrate may comprise fibers and/or filaments having a diameter of from 0.1 to 150 µm, preferably from 1 to 20 µm, and/or threads having a diameter of from 1.5 to 15 µm, preferably from 2.5 to 7.5 µm. If the substrate comprises polymer fibers, they preferably have a diameter of from 0.1 to 10 µm, particularly preferably from 1 to 5 µm. Particularly preferred nonwovens, in particular nonwoven polymer fabrics, have a weight per unit area of less than 20 g/m$^2$, preferably from 5 to 15 g/m$^2$. In this way, a particularly small thickness and high flexibility of the substrate is ensured.

Particularly preferably, the separator according to the invention comprises a nonwoven polymer fabric as a substrate, which has a thickness of less than 30 µm, preferably having a thickness of from 10 to 20 µm. As homogeneous as possible a pore radius distribution in the nonwoven is particularly important for use in a separator according to the invention. As homogeneous as possible a pore radius distribution in the nonwoven, in combination with optimally tailored oxide particles of a certain size, leads to an optimized porosity of the separator according to the invention.

The inorganic adhesive in the separator according to the invention is preferably selected from oxides of the elements Al, Si and/or Zr. The inorganic adhesive may comprise particles having a mean particle size of less than 20 nm and may have been prepared via a particulate sol or may have an inorganic network of the oxides which was produced via a polymeric sol.

It may be advantageous if the separator according to the invention additionally has an inorganic, silicon-comprising network, the silicon of the network being bound via oxygen atoms to the oxides of the inorganic coating and via an organic radical to the substrate, which comprises polymer fibers. Such a network can be obtained, for example, if an adhesion promoter, for example a silane-based one, is used in the production of the separator, and this adhesion promoter is subjected to the thermal treatment customary in the production.

The porous, electrically insulating coating present on and in the substrate particularly preferably has a mean pore size in the range from 50 nm to 5 µm and preferably from 100 to 1000 nm.

It may be advantageous if the porous, electrically nonconductive coating present on and in the substrate has a film comprising one or more polymers. The film is preferably such that the film covers the surface, in particular the internal and external surfaces of the coating. The surface of the coating may be understood as meaning both the macroscopic surface of the layer and the microscopic surface, i.e. all surfaces accessible from the outside (internal and external surfaces), such as, for example, pore surfaces. Preferably, the coating comprises, preferably on its microscopic surface, a film comprising one or more polymers which preferably has a thickness of from 10 nm to 5 mm. The film comprising polymers may have an open-pore, foam-like structure, which is preferred because of its good ion conductivity. Such a foam-like structure is obtained in particular with the use of PVDF or PVDF copolymers if inorganic particles are present. By means of the polymer film, the handling properties and strength of the separator according to the invention can be even further increased. In particular, the dust formation during cutting and the flaking of the ceramic coating can be reduced, even in the case of repeated bending or creasing of the separator. The wettability of a separator according to the invention which has been treated in this manner is of course substantially determined by the wettability of the polymer used for the film, i.e. may correspond to the wettability of PP/PE as a hydrophobic polymer but may also be very hydrophilic, as with the use of PVDF copolymers.

The stability of the separator to the action of heat and hence also the safety of the separator is decisively determined by the oxide particles of the coating. Moreover, the pore size is substantially determined by the coating or the particle size of the particles present in the coating and can therefore be relatively finely adjusted. In addition, polymers which, owing to their material properties, are unsuitable or only poorly suitable for producing pure polymer separators or ceramic-filled polymer separators from them can be used for the polymer film, so that the range of the usable polymers increases for such a separator.

The separators according to the invention can be bent without damage, preferably to any radius down to 100 m, preferably to a radius from 100 m down to 50 mm and very particularly preferably to a radius from 50 mm down to 0.5 mm. The separators according to the invention are also distinguished in that they preferably have a tensile strength of at least 1 N/cm, preferably of at least 3 N/cm and very particularly preferably of greater than 5 N/cm. The high tensile strength and the good flexibility of the separator according to the invention have the advantage that changes in the geometries of the electrodes which occur during charging and discharging of a battery can be copied by the separator without it being damaged. The flexibility moreover has the advantage that commercially standardized spiral-wound cells can be produced with this separator. In these cells, the electrode/separator layers are wound up spirally with one another in a standardized size and contacted.

The separator according to the invention preferably has a porosity of from 30 to 80%. The porosity is based on the achievable, i.e. open pores. The porosity can be determined by the known method of mercury porosimetry (based on DIN 66 133) or can be calculated from the volume and the density of the starting materials used if it is assumed that only open pores are present.

The separators according to the invention preferably have a thickness of less than 50 µm, preferably less than 40 µm, particularly preferably a thickness of from 5 to 30 µm and very particularly preferably a thickness of from 10 to 20 µm. The thickness of the separator has a considerable influence on the properties of the separator since firstly the flexibility but secondly also the surface resistance of the separator impregnated with electrolyte are dependent on the thickness of the separator. Owing to the small thickness, a particularly low electrical resistance of the separator is achieved in the application with an electrolyte. The separator itself does of course have a very high electrical resistance since it itself must have insulating properties. Moreover, relatively thin separators permit a higher packing density in a battery stack, so that a greater quantity of energy can be stored in the same volume.

Owing to its design according to the invention, the separator of the present invention is outstandingly suitable for electrochemical cells having a high capacity and high energy density. In particular, the separator according to the invention is suitable for electrochemical cells which are based on the transfer of alkali metal and/or alkaline earth metal ions, such as, for example, lithium metal and lithium ion batteries. It is therefore advantageous if these separators also exhibit the safety measures specific for these applications, such as the shut-down property and short-circuit property at high short-circuit temperature. Shut-down is to be understood as meaning a measure in which low-melting substances which are to be sought, such as, for example, thermoplastics, can be incorporated into the separator for certain operating temperatures. When the operating temperature increases as a result of faults, such as overcharging or external or internal short-circuits, such low-melting substances can melt and block the pores of the separators. The ion flow through the separator is thus partly or completely blocked, and a further increase in the temperature is prevented. Short-circuit properties or melt-down means that the separator completely melts at a short-circuit temperature. Contact and a short-circuit can then occur between large areas of the electrodes of an electrochemical cell. For safe operation of an electrochemical cell with high capacity and energy density, as high a short-circuit temperature as possible is desirable. The separator according to the invention has an important advantage. This is because the ceramic material which, in the separator of the present invention, adheres to the open substrate has a melting point which is well above the safety-relevant temperature range for electrochemical cells. The separator of the present invention therefore has outstanding safety.

Polymer separators have, for example, the safety currently required for lithium batteries in that they suppress any current transport through the electrolyte from a certain temperature (the shut-down temperature, which is about 120° C.). This occurs because, at this temperature, the pore structure of the separator collapses and all pores are closed. Because ions can no longer be transported, the dangerous reaction which can lead to an explosion ceases. If, however, the cell is further heated owing to external circumstances, the melt-down temperature is exceeded at about 150 to 180° C. From this temperature, melting of the separator occurs, said separator contracting. In many areas in the battery cell, there is now direct contact between the two electrodes and hence an internal short-circuit over a large area. This leads to an uncontrolled reaction which frequently ends with explosion of the cell, or the resulting pressure is reduced by means of a pressure control valve (a bursting disk), frequently with appearance of fire.

In the context of the present invention, the flexible, open substrate of the separator may comprise polymer fibers. In this hybrid separator, which substantially comprises inorganic coating and polymeric substrate material, shut-down occurs if the polymer structure of the substrate material melts owing to the high temperature and penetrates into the pores of the inorganic coating and thus closes them. On the other hand, so-called melt-down does not occur in the separator according to the invention. The separator according to the invention thus meets the requirements for a safety shut-down required by various battery manufacturers through the shut-down in the battery cells. The inorganic particles ensure that a melt-down can never occur. It is thus ensured that there are no battery states in which a short-circuit over a large area can result.

Even in the case of an internal short-circuit, which was caused, for example, by an accident, the separator according to the invention is very safe. If, for example, a nail were to bore through the battery, the following transpires depending on the separator: the polymer separator would melt at the penetration point (a short-circuit current flows via the nail and heats it up) and contract. As a result, the short-circuit area becomes constantly larger and the reaction goes out of control. In the embodiment comprising the hybrid separator according to the invention, all that happens is that the polymeric substrate material melts, but not the inorganic material of the coating. Thus, the reaction in the interior of the battery cell takes place very much more moderately after such an accident. Such a battery is therefore substantially safer than one equipped with a polymer separator. This is especially evident in the mobile sector.

It may be advantageous if the separator has an additional noninherent shut-down mechanism. This can be realized, for example, if a very thin wax or polymer particle layer of so-called shut-down particles, which melt at a desired shut-down temperature, is present on or in the separator (on the microscopic surface of the coating), preferably on the separator. Particularly preferred materials of which the shut-down particles can consist are, for example, natural or synthetic waxes, low-melting polymers, such as, for example, polyolefins, the material of the shut-down particles being chosen so that the particles melt at the desired shut-down temperature and close the pores of the separator so that further ion flow is prevented.

The shut-down particles preferably have a mean particle size ($D_w$) which is greater than or equal to the mean particle size ($d_s$) of the pores of the porous coating of the separator. This is advantageous in particular because in this way penetration and closing of the pores of the separator layer, which would result in a reduction in the pore volume and hence in the conductivity of the separator and also the efficiency of the battery, is prevented. The thickness of the shut-down particle layer is critical only if an excessively thick layer were to unnecessarily increase the resistance in the battery system. In order to achieve a safe shut-down, the shut-down particle layer should have a thickness ($z_w$) which is approximately equal to the mean particle size of the shut-down particles ($D_w$) up to 10 $D_w$, preferably of 2 $D_w$ to $D_w$. A separator treated in this manner has a primary safety feature. In contrast to the purely organic separator materials, however, this separator cannot melt completely and hence melt-down cannot occur. Owing to the very large quantities of energy, these safety features are very important for high-energy batteries and are therefore frequently required.

In a further variant of the separator according to the invention, said separator has, on the macroscopic surface of the coating which comprises oxide particles of the elements Al, Si and/or Zr and polymer particles, a porous shut-down layer comprising a material which melts at a predetermined temperature and closes the pores of the inorganic layer, the shut-down layer being formed by a porous sheet-like structure.

It is possible in principle for the shut-down layer to be present on both sides of the separator. However, it has proven to be advantageous if the shut-down layer is present only on one side of the separator according to the invention. A single shut-down layer is sufficient to ensure safe shut-down when required.

The shut-down layer or shut-down particle layer present according to the invention on the inorganic layer may consist, for example, of natural or synthetic waxes, (low-melting) polymers, such as, for example, special polyolefins, such as, for example, polyethylene or polypropylene, or polymer blends or mixtures, the material of the shut-down layer being chosen so that the shut-down layer melts at the desired shut-down temperature and closes the pores of the separator so that further ion flow is prevented. Preferred materials for the shut-down layer are those materials which have a melting point of less than or equal to 180° C., preferably less than 130° C. By using materials which enable the shut-down to be effective at relatively low temperatures, melting or ignition of the materials surrounding the batteries, such as, for example, housings or cables, can be very substantially avoided. Particularly preferably, the separator according to the invention has a shut-down layer comprising polyethylene (wax).

The thickness of the shut-down layer is in principle arbitrary, provided that it is ensured that a reduction in the ion flow and hence in the conductivity of the separator, which would result in a reduction in the efficiency of the battery, is prevented. The thickness of the shut-down layer is critical only in that an excessively thick layer would unnecessarily increase the resistance in the battery system. In order to achieve a safe shut-down, the shut-down layer should have a thickness of from 1 to 20 µm, preferably from 5 to 10 µm. It may be advantageous if the material of the shut-down layer and at least parts of the material of the substrate are identical. The porosity of the shut-down layer is preferably from 20 to 80% and preferably from 40 to 60%.

The separator according to the invention can be obtained, for example, by the below-described method according to the invention. This method is based on the method for the production of separators or membranes as described in principle in WO 99/15262. This publication is hereby incorporated by reference.

The method, according to the invention, for the production of a separator is distinguished in that a substrate which comprises fibers of an electrically nonconductive material and voids between the fibers is provided with a ceramic coating, for which purpose a suspension is applied on and in the substrate and said suspension is solidified on and in the substrate by heating at least once, the suspension comprising a sol and at least two particle fractions suspended in the sol, the first fraction of which comprises or consists of oxide particles selected from the oxides of the elements Al, Zr and/or Si, and the second fraction of which comprises or consists of polymer particles.

Polymer particles which may be used in the method according to the invention are, for example, particles of polymers and copolymers, in particular selected from PVDF, PP, PE and other polymers stable in lithium batteries. Preferably used polymer particles are those which have a melting point which is between 100° C. and 250° C. They may therefore be lower than the highest temperature which is used in the production of the separator. If the polymer particles used have a lower melting point, preferably used polymers are those which do not wet the oxide particles during the production of the membrane and preferably retain a substantially spherical structure. Such polymers are, for example, PE and PP and copolymers thereof. Wetting of the oxide particles by the polymer would lead to a separator which would have a wettability predetermined by the polymer and which would behave like a polymer separator having a high content of ceramic filler. Preferably used polymer particles have a melting point of less than 200° C., preferably of less than 180° C. and very particularly preferably of from 100 to 150° C.

If, in the method according to the invention, a polymer particle fraction whose polymer particles have a higher melting point than the solidification temperature used in the production process is added to the sol during the preparation of the suspension, a separator is obtained which has a continuous porous ceramic phase (coating) in which the polymer particles are present in random distribution, such as, for example, Kynar Flex® 2801 from Arkema or PVDF-ethylene copolymer. If polymer particles which have a melting point lower than the solidification temperature are used in the method according to the invention, comparable structures are obtained provided that the formulation of the suspension is adjusted so that the polymer particles in the molten state do not spread over the other particles but remain as a molten polymer sphere. Suitable polymer particles having a relatively low melting point are, for example, those of PP and PE and copolymers thereof, which can be used if the suspension is adjusted to be relatively hydrophilic, i.e. for example a small proportion of methyl triethoxysilane is used for the preparation of the sol.

Polymer particles and oxide particles are preferably used for the preparation of the suspension in amounts such that the volume ratio of the particles of the oxide particle fraction to the particles of the polymer particle fraction is greater than 4:1, preferably from 4:1 to 100:1, preferably from 5:1 to 50:1 and particularly preferably from 10:1 to 20:1. The volume ratio can be determined by determining the masses of polymer particles and oxide particles used, taking into account the material density.

It may be advantageous to use at least one oxide particle fraction whose particles have a mean particle size of from 0.1 to 10 µm, preferably from 0.5 to 5 µm and particularly preferably from 1 to 3 µm. Aluminum oxide particles which preferably have a mean particle size of from 0.5 to 10 µm, preferably from 1 to 4 µm, are particularly preferably used as oxide particles for the preparation of the suspension. Aluminum oxide particles in the range of the preferred particle sizes are available, for example, from Martinswerke under the names MZS 3 and MZS1, and from AlCoA under the names CT3000 SG, CL3000 SG, CT1200 SG, CT800SG and HVA SG.

A preferably used polymer particle fraction is a fraction whose particle has a mean particle size which corresponds to from 0.1 to 30 times, preferably from 0.75 to 25 times, preferably from 0.9 to 15 times and particularly preferably from 1 to 10 times the mean particle size of the oxide particles. The method according to the invention can be very particularly advantageously carried out if exclusively oxide particles and/or polymer particles which have a mean particle size which is less than 0.5 times, preferably less than 0.2 times and preferably less than 0.1 times the thickness of the separator are used. In this way, it is ensured that the separator comprises at least two layers of particles in addition to the substrate.

In the method according to the invention, the application and introduction of the suspension onto the substrate and into the voids of the substrate can be effected, for example, by imprinting, pressing on, pressing in, rolling on, applying with a doctor blade, coating, immersion, spraying or pouring on.

The substrate used preferably has a thickness of less than 30 µm, preferably less than 20 µm and particularly preferably a thickness of from 10 to 20 µm. Particularly preferably used substrates are those as described in the description of the separator according to the invention. The porous substrate used thus particularly preferably comprises woven or unwoven polymer fibers. A particularly preferably used substrate is one which comprises a woven polymer fabric or nonwoven polymer fabric or is such a woven fabric or nonwoven. Preferably, the substrate used comprises polymer fibers which have a softening temperature of more than 100° C. and a melting temperature of more than 110° C. It may be advantageous if the polymer fibers have a diameter of from 0.1 to 10 µm, preferably from 1 to 5 µm. In the method according to the invention, a substrate which comprises fibers selected from polyacrylonitrile, polyester, polyamide and/or polyolefin is particularly preferably used.

The suspension used for the production of the coating comprises at least particles of $Al_2O_3$, $ZrO_2$ and/or $SiO_2$, at least one fraction of polymer particles and at least one sol, preferably a sol of the elements Al, Zr and/or Si, and is prepared by suspending the particles in at least one of these sols. The suspending can be effected by thorough mixing of the components.

It has been found that the use of commercial oxide particles leads in certain circumstances to unsatisfactory results since a very broad particle size distribution is frequently present. Metal oxide particles which were classified by a conventional method, such as, for example, air classification and hydroclassification, are therefore preferably used. Preferably used oxide particles are those fractions in which the proportion of coarse particles, which accounts for up to 10% of the total amount, were separated off by wet sieving. This troublesome proportion of coarse particles, which can be comminuted only with very great difficulty, if at all, even by methods typical in the preparation suspension, such as, for example, milling (ball mill, attritor mill, mortar mill), dispersing (Ultra-Turrax, ultrasound), trituration or chopping, may consist, for example, of aggregates, hard agglomerates or grinding ball abrasion. The measures according to the invention ensure that the electrically non-conductive coating has a very uniform pore size distribution.

Table 1 below gives an overview of the effect of the choice of the various aluminum oxides on the porosity and the resulting pore size of the respective porous inorganic coating. For determining these data, the corresponding slips (suspensions or dispersions) were prepared and were dried and solidified as pure moldings at 200° C.

TABLE 1

Typical data of ceramics as a function of the powder type used

| $Al_2O_3$ type | Porosity in % | Mean pore size in nm |
| --- | --- | --- |
| AlCoA CL3000SG | 51 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47 | 445 |
| Martinsw. MZS 3 | 48 | 690 |

The mean pore size and the porosity is to be understood as meaning the mean pore size and the porosity which can be determined by the known mercury porosimetry method, for example using a porosimeter 4000 from Carlo Erba Instruments. The mercury porosimetry is based on the Washburn equation (E. W. Washburn, "Note on a Method of Determining the Distribution of Pore Sizes in a Porous Material", *Proc. Natl. Acad. Sci.*, 7, 115-16 (1921)).

In the suspension used, the mass fraction of the suspended components (i.e. of the particles) is preferably between 10 and 80%, particularly preferably between 30 and 70%.

The sols can be obtained by hydrolyzing at least one (precursor) compound of the elements Zr, Al and/or Si. It may be advantageous to introduce the compound to be hydrolyzed, prior to hydrolysis, into alcohol or an acid or a combination of these liquids. At least one nitrate, one chloride, one carbonate or one alcoholate compound of the elements Zr, Al and/or Si is preferably hydrolyzed as the compound to be hydrolyzed. The hydrolysis is preferably effected in the presence of water, steam, ice, alcohol or an acid or a combination of these compounds. The sols are preferably obtained by hydrolyzing a compound of the elements Al, Zr or Si with water or an acid diluted with water, the compounds preferably being present in solution in a nonaqueous, optionally also anhydrous solvent and being hydrolyzed with 0.1-100 times the molar ratio of water.

In an embodiment of the production method for the separator according to the invention, particulate sols are prepared by hydrolyzing the compounds to be hydrolyzed. These particulate sols are distinguished in that the compounds formed in the sol by hydrolysis are present in particulate form. The particulate sols can be prepared as described above or as described in WO 99/15262. These sols usually have a very high water content, which is preferably greater than 50% by weight. It may be advantageous to introduce the compound to be hydrolyzed, prior to hydrolysis, into an alcohol or an acid or a combination of these liquids.

It was found that a sol system or a suspension, which system or which suspension was adapted in the wetting behavior to the polymers, completely impregnates the substrate materials, in particular the nonwoven materials, and defect-free coatings are thus obtainable. In the method according to the invention, adaptation of the wetting behavior of the sol or of the suspension is therefore preferably effected. This adaptation is preferably effected by the preparation of polymeric sols or suspensions of polymeric sols, these sols comprising one or more alcohols, such as, for example, methanol, ethanol, propanol or mixtures thereof. However, other solvent mixtures which can be added to the sol or the suspension for adapting them in the wetting behavior to the nonwoven used are also conceivable.

It was found that the basic change in the sol system and in the suspension resulting therefrom leads to a substantial improvement in the adhesion properties of the ceramic components on the or in a polymeric nonwoven material. Such good adhesion properties are usually not obtainable with particulate sol systems. Nonwovens which comprise polymer fibers are therefore preferably coated by means of suspensions which are based on polymeric sols or were treated in an upstream step by treatment with a polymer sol comprising an adhesion promoter.

In a further embodiment of the production process for the separator which can be used according to the invention, polymeric sols are prepared by hydrolyzing the compounds to be hydrolyzed. These polymeric sols are distinguished in that compounds formed in the sol by hydrolysis are present in polymeric form (i.e. are crosslinked in the form of chains over a relatively large region). The polymeric sols usually comprise less than 50% by weight, preferably very much less than 20% by weight, of water and/or aqueous acid. In order to arrive at the preferred proportion of water and/or aqueous acid, the hydrolysis is preferably carried out in such a way that the compound to be hydrolyzed is hydrolyzed with a 0.5- to 10-fold molar ratio and preferably with half the molar ratio of water, steam or ice, based on the hydrolyzable group of the hydrolyzable compound. An up to 10-fold amount of water can be used in the case of very slowly hydrolyzing compounds, such as, for example, in the case of tetraethoxysilanes. Very rapidly hydrolyzing compounds, such as zirconium tetraethylate can readily form particulate sols under these conditions, and it is for this reason that a 0.5-fold amount of water is used for hydrolyzing such compounds. Hydrolysis with less than the preferred amount of water, steam or ice likewise leads to good results. Falling below the preferred amount of half the molar ratio by more than 50% is possible but not very expedient since, on falling below this value, the hydrolysis is no longer complete and coatings based on such sols are not very stable.

For the preparation of these sols having the desired very small proportion of water and/or acid in the sol, it may be advantageous if the compound to be hydrolyzed is dissolved in an organic solvent, in particular ethanol, isopropanol, butanol, amyl alcohol, hexane, cyclohexane, ethyl acetate and/or mixtures of these compounds before the actual hydrolysis is carried out. A sol prepared in this manner can be used for the preparation of the suspension according to the invention or as an adhesion promoter in a pretreatment step. A suspension which comprises a polymeric sol of a compound of silicon is particularly preferably used for the production of the separator according to the invention.

Both the particulate sols and the polymeric sols can be used as a sol in the method, according to the invention, for the preparation of the suspension. In addition to the sols, which are obtainable as described above, it is also possible in principle to use commercial sols, such as, for example, zirconium nitrate sol or silica sol.

For improving the adhesion of the inorganic components to polymer fibers or nonwoven polymer fabrics as substrate, but also for improving the adhesion of a shut-down layer optionally to be applied subsequently, it may be advantageous to add adhesion promoters, such as, for example, organofunctional silanes, such as, for example, the Degussa silanes GLYMO, GLYEO, MEMO, AMEO, VTEO or Sulfin, to the suspensions used. The addition of adhesion promoters is preferred in the case of suspensions based on polymeric sols. Adhesion promoters which may be used are in particular compounds selected from the octylsilanes, the vinylsilanes, the aminofunctionalized silanes and/or the glycidyl-functionalized silanes, such as, for example, the Dynasilans from Degussa. Particularly preferred adhesion promoters for polyethylene (PE) and polypropylene (PP) are vinyl-, methyl- and octylsilanes, exclusive use of methylsilanes not being optimum. The adhesion promoter must be selected so that the solidification temperature is below the melting point or softening point of the polymer used as substrate and below the decomposition temperature thereof. Adhesion promoters which may be used are in particular the silanes mentioned in table 2. Suspensions according to the invention preferably comprise very much less than 25% by weight, preferably less than 10% by weight, of compounds which can act as adhesion promoters.

TABLE 2

| Polymer | Organofunctional type | Adhesion promoter |
|---------|----------------------|-------------------|
| PAN | Glycidyl | GLYMO |
|  | Methacryl | MEMO |
| PA | Amino | AMEO, DAMO |
| PET | Methacryl | MEMO |
|  | Vinyl | VTMO, VTEO, VTMOEO |
| PE, PP | Amino | AMEO, AMMO |
|  | Vinyl | VTMO, VTEO, Silfin |
|  | Methacryl | MEMO | where:
AMEO = 3-aminopropyltriethoxysilane
DAMO = 2-aminoethyl-3-aminopropyltrimethoxysilane
GLYMO = 3-glycidyloxytrimethoxysilane
GLYEO = 3-glycidyloxytriethoxysilane
MEMO = 3-methacryoyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The suspension present on the substrate and in the voids of the substrate as a result of the application and introduction can solidify, for example, by heating to 50 to 350° C. Since the maximum temperature is predetermined by the substrate material when polymeric substrate materials are used, said temperature should be appropriately adapted so that the substrate material does not melt or soften. Thus, depending on the embodiment of the method, the suspension present on or in the substrate is preferably solidified by heating to 100 to 350° C. and very particularly preferably by heating to 200 to 280° C. The heating of the suspension of the nonwoven polymer fabric comprising polyester fibers is preferably effected for from 0.2 to 10 minutes at a temperature of from 200 to 220° C. The heating of the suspension on a nonwoven polymer fabric comprising polyamide fiber is preferably effected from 0.5 to 10 minute at a temperature of from 170 to 200° C. The heating of the composite can be effected by means of heated air, hot air or infrared radiation or by other heating methods according to the prior art.

The method for the production of separators which can be used in the method according to the invention can be carried out, for example, by a procedure in which the substrate is unrolled from a roll, passes at a speed of from 1 m/h to 2 m/s, preferably at a speed of from 0.5 m/min to 20 m/min, through at least one apparatus which applies the suspension on and in the substrate, such as, for example, a roll, and at least one further apparatus which permits the solidification of the suspension on and in the substrate by heating, such as, for example, an electrically heated oven, and the separator thus produced is rolled up on a second roll. In this way, it is possible to produce a separator in a continuous method. Furthermore, pretreatment steps can be carried out in the continuous method while retaining said parameters.

In a particularly preferred embodiment of the method according to the invention, after solidification of the suspension, the resulting ceramic coating is additionally treated initially with a solution of a polymer or a mixture of polymers. The solvent is then removed. All soluble polymers are suitable as polymers for use in this embodiment of the method according to the invention. Preferably used polymers are those which are selected from polyvinylidene fluoride (PVDF), PVDF copolymers, polyethylene, polypropylene and waxes. A particularly preferably used polymer is PVDF or PVDF copolymer or a mixture of these polymers. Solvents which may be used are all solvents which are capable of dissolving the selected polymer or the selected polymers. Preferred solvents have a relatively high vapor pressure so that the solvent can be easily removed. Very particularly preferred solvents are those which have as far as possible no effect, or only a slight effect, which is harmful to the health of living beings. Possible solvents to be used may be, for example, hydrocarbons, such as, for example, hexane or octane, carbonyl compounds, such as, for example, acetone, ethers, such as, for example, tetrahydrofuran, petroleum ether or diethyl ether. Hydrocarbons are preferably used as solvents with the use of the preferred polyolefins, and ketones, such as acetone, are preferably used as solvents with the use of the preferred PVDF copolymers.

The solution of the polymer/copolymer or of the mixture of polymers/copolymers preferably comprises less than 50% by mass, preferably less than 10% by mass, particularly preferably less than 5% by mass and very particularly preferably from 0.5 to 5% by mass of polymers and/or copolymers.

The treatment of the ceramic coating with the polymer solution can be effected, for example, by imprinting, pressing on, pressing in, rolling on, application with a doctor blade, coating, immersion, spraying and pouring on. If the polymer solution is also to penetrate into the pores of the ceramic coating, it may be advantageous if the solution has a viscosity of less than 1000 mPa·s, preferably less than 100 mPa·s. The viscosity of the solution used is preferably determined using a rotational viscometer comprising a cone-and-plate measuring system of the type RS150, from Haake, and a mean shear rate of about 100 $sec^{-1}$, based on DIN 53 019. For adjusting the viscosity of the solution, for example, highly structured pyrogenic oxides of $SiO_2$ or $Al_2O_3$, such as, for example, Aerosil or Aeroxides from Degussa, may be added to the solution.

The solvent can be removed at room temperature or at elevated temperature. The solvent is preferably removed by heating the treated separator to a temperature of from 25 to 110° C., preferably from 35 to 80° C. The heating is preferably carried out until the solvent is completely evaporated. It may be advantageous to collect and to condense the evaporated solvents and to use the condensate for further preparation of the polymer solution. In this way, environmental pollution can be very substantially prevented and the amount of starting materials required can be substantially reduced.

For adjusting the thickness of the resulting layer, it may be advantageous to repeat the treatment of the ceramic coating with polymer solution and the subsequent removal of the solvent once or several times.

Regardless of whether the electrically nonconductive coating was equipped with a polymer film or not, the separators according to the invention can, in a particular embodiment of the method according to the invention, additionally be equipped with a shut-down layer. If they are not produced using an adhesion promoter, the separators produced according to the invention frequently have inorganic coatings which have a very hydrophilic character. A plurality of variants are possible for achieving good adhesion of the shut-down layer also on hydrophilic porous inorganic layers.

In one embodiment of the method according to the invention, it has proven to be advantageous to render a porous inorganic layer hydrophobic before the application of the shut-down layer. The production of hydrophobic membranes which can serve as starting material for the production of the separators according to the invention is described, for example, in WO 99/62624.

In a further embodiment of the method according to the invention, the porous inorganic layer can also be treated with other adhesion promoters before the application of the shut-down layer. The treatment with an adhesion promoter can then also be effected as described above, i.e. the porous inorganic layer is treated with a polymeric sol which comprise a silane as adhesion promoter. In particular, the treatment can be effected in a manner such that adhesion promoters are used in the production of the separator as described above. The adhesion promoters are preferably selected from the series consisting of the hydrolyzed or unhydrolyzed functionalized alkyltrialkoxysilanes. MEMO, AMEO and/or GLYMO are very particularly used as adhesion promoters.

The shut-down layer may be, for example, a porous sheet-like structure or a layer comprising particles, the sheet-like structure or the particles consisting of a material which melts at a certain temperature. The shut-down layer based on a porous sheet-like structure is produced on the porous inorganic layer of the separator preferably by applying a woven fabric, knitted fabric, felt or nonwoven or a porous sheet as a porous sheet-like structure to the porous inorganic layer. The application of the shut-down layer can be effected by laying the porous sheet-like structure on, or laminating said structure with, the porous inorganic layer. The lamination can be carried out at room temperature or at elevated temperature which is below the melting point of the material of the sheet-like structure. During the lamination, the abovementioned adhesion promoters can be used as laminating auxiliaries. The adhesion promoters may be selected from the known series consisting of the alkyltrialkoxysilanes. These adhesion promoters are preferably present in the form of solutions or sols and are either first applied to the polymer or separator and solidified there or the silanes are introduced directly before or during the lamination, and polymer and ceramic are adhesively bonded in this manner. Suitable silanes are obtainable, for example, from Degussa as pure products or as aqueous solutions of the hydrolyzed silane, for example under the name Dynasilan® 2926, 2907 or 2781.

In another preferred embodiment of the method according to the invention, the separator according to the invention is provided with a shut-down function by a procedure in which particles are applied and fixed as shut-down particles, which particles have a defined, desired melting point. If the separators according to the invention were produced without the use of an adhesion promoter, they have a ceramic coating which frequently has a very hydrophilic character. A plurality of variants is possible for achieving good adhesion and uniform distribution of the shut-down particles in the shut-down layer, even on hydrophilic porous inorganic layers.

Firstly, separators can be provided with shut-down particles by a procedure in which a hydrophobic separator is obtained from a corresponding hydrophilic separator by treatment with a water repellent, and shut-down particles are then applied. Furthermore, however, it is also possible to apply the shut-down particles as a mixture with adhesion promoters and to fix them by a suitable aftertreatment, such as, for example, drying. Adhesion promoter-comprising suspensions of shut-down particles preferably comprise from 0.1 to 10% by weight, preferably from 1 to 7.5% by weight and very particularly preferably from 2.5 to 5% by weight of adhesion promoter, based on the suspension.

Shut-down particles which may be used are all particles which have a defined melting point. The material of the particle is selected according to the desired shut-down temperature. Since relatively low shut-down temperatures are desired in the case of most batteries, it is advantageous to use those shut-down particles which are selected from particles comprising polymers, polymer blends, natural and/or synthetic waxes. Particularly preferably used shut-down particles are particles comprising polypropylene wax or polyethylene wax.

The suspension comprising the shut-down particles can be applied to the porous inorganic layer by imprinting, pressing on, pressing in, rolling on, applying with a doctor blade, coating, immersion, spraying or pouring on. The shut-down layer is preferably obtained by drying the applied suspension at a temperature from room temperature to 100° C., preferably from 40 to 60° C. The drying must be carried out in such a way that the shut-down particles do not melt.

Further details of the equipping of the separators according to the invention with shut-down layers can be obtained from the documents DE 102 38 945 (shut-down particle layers) and DE 103 47 567 (shut-down layers), which are hereby incorporated by reference and the content of which is to be part of the disclosure of the present invention.

The separators according to the invention or the separators produced according to the invention can be used as a separator in batteries, in particular as a separator in lithium batteries, preferably lithium high-performance or high-energy batteries. Such lithium batteries can have lithium salts with large anions as electrolytes in carbonates as solvents. Suitable lithium salts are, for example, $LiClO_4$, $LiBF_4$, $LiAsF_6$ or $LiPF_6$, $LiPF_6$ being particularly preferred. Organic carbonates suitable as solvents, are, for example, ethylene carbonate, propylene carbonate, dimethyl carbonate, ethyl methyl carbonate or diethyl carbonate or mixtures thereof.

Lithium batteries which have a separator according to the invention can be used in particular in vehicles having an electric drive or a hybrid drive technology, such as, for example, electric cars or hybrid cars.

The present invention is described by the following examples without being limited thereto.

EXAMPLES

Comparative Example: Separator According to the Prior Art

First 30 g of a 5% strength by weight aqueous $HNO_3$ solution, 10 g of tetraethoxysilane, 2.5 g of methyltriethoxysilane and 7.5 g of Dynasilan GLYMO (Degussa AG) were added to 130 g of water and 15 g of ethanol. In each case 250 g of the aluminum oxides Martoxid MZS-1 (Martinswerke) were then suspended in this sol which was first stirred for a few hours. This slip was homogenized for at least a further 24 h using a magnetic stirrer, and it was necessary to cover the stirred vessel in order to prevent loss of solvent.

A 20 cm wide nonwoven PET fabric (Freudenberg Vliesstoffe KG) having a thickness of about 20 μm and a weight per unit area of about 15 g/m² was then coated with the above slip in a continuous roll-coating method (belt speed about 30 m/h, T=200° C.). A separator having a mean pore size of 250 nm was finally obtained.

Example 1

First 5 g of a concentrated $HNO_3$ solution, 10 g of tetraethoxysilane, 1 g of methyltriethoxysilane and 7.5 g of Dynasilan GLYMO (Degussa AG) were added to 130 g of water and 32 g of ethanol. In each case 250 g of the aluminum oxides Martoxid MZS-1 (Martinswerke) and 18 g of PVDF copolymer powder (Kynarflex 2801; Arkema GmbH; 140° C. m.p.) were then suspended in this sol, which was initially stirred for a few hours. This slip was homogenized for at least a further 24 h using a magnetic stirrer, and it was necessary to cover the stirred vessel in order to prevent loss of solvent.

A 20 cm wide nonwoven PET fabric (Freudenberg Vliesstoffe KG) having a thickness of about 20 μm and a weight per unit area of about 10 g/m² was then coated with the above slip in a continuous roll-coating method (belt speed about 30 m/h, T=200° C.). A separator having a mean pore size of 250 nm was finally obtained.

Example 2

First 5 g of a concentrated $HNO_3$ solution, 10 g of tetraethoxysilane, 1 g of methyltriethoxysilane and 7.5 g of Dynasilan GLYMO (Degussa AG) were added to 130 g of water and 32 g of ethanol. In each case 230 g of the aluminum oxide ct 3000 SG from Alcoa and 18 g of polyolefin copolymer powder (Vestowax A616; Degussa AG; 120° C. m.p.; d50=5-6 μm) were then suspended in this sol, which was initially stirred for a few hours. This slip was homogenized for at least a further 24 h using a magnetic stirrer, and it was necessary to cover the stirred vessel in order to prevent loss of solvent.

A 20 cm wide nonwoven PET fabric (Freudenberg Vliesstoffe KG) having a thickness of about 20 μm and a weight per unit area of about 10 g/m² was then coated with the above slip in a continuous roll-coating method (belt speed about 30 m/h, T=200° C.) and said slip was solidified at said temperature. A separator having a mean pore size of 100 nm was finally obtained.

Example 3

A solution of 3% by mass of Kynarflex 2801 in acetone was applied in a continuous impregnation process to a separator which was obtained according to example 1, at a speed of 1 m/min, and dried at a temperature of 60° C. in a hot air stream.

Example 4

A solution of 0.5% by mass of Kynarflex 2801 in acetone was applied in a continuous impregnation process to a separator which was obtained according to example 1, at a speed of 5 m/min, and dried at a temperature of 80° C. in a hot air stream.

Example 5

A solution of 3% by mass of Vestowax A616 in cyclohexane, the incompletely dissolved partly crosslinked insoluble particles having been separated off by means of a filter, was applied in a continuous impregnation process to a separator which was obtained according to example 2, at a speed of 10 m/min, and dried at a temperature of 100° C. in a hot air stream.

Example 6: Characterization of the Separators

The separators produced in examples 1 to 5 and in the comparative example were characterized as described below. The results are listed in table 3.

Determination of the MacMullin Number:

For this purpose, the conductivity CON1 of the pure electrolyte (a 0.01 molar solution of $LiClO_4$ in propylene carbonate) was first determined at 30° C. using a conductometer (Metrohm). Thereafter, the separator was impregnated with electrolyte, and the conductivity CON2 thereof was likewise determined. The MacMullin number is the ratio of these two conductivities CON1/CON2.

Determination of the BP:

The bubble point (BP) is the pressure in bar at which a gas bubbles passes through a completely wetted membrane (separator). It is a measure of the size of the largest pore or hole in a membrane. The lower the BP, the larger is the largest pore or the largest hole.

For measurement of the bubble point, a membrane having a size of 30 mm diameter was cut out. The membrane cutout was stored for at least one day in the wetting liquid (demineralized water). The membrane thus prepared was installed in an apparatus between a round sintered metal disk having a BP of about 0 bar (measurement without membrane), which serves as support material, and a silicone rubber seal, the apparatus having, above the membrane, a vessel which was open at the top and which had the same cross section as the membrane and was filled with 2 cm of demineralized water, and had, below the membrane, a second vessel which likewise had the same cross section as the membrane and which was equipped with an air inlet via which compressed air could be passed via a pressure reducing valve into the vessel. The membrane was installed under the sintered metal disk so that the sintered metal disk formed the bottom of the upper vessel and the membrane closed the lower vessel. The pressure was then increased in the lower vessel in 0.1 bar steps, half a minute elapsing between each pressure increase. After each pressure increase, the water surface in the upper vessel was observed for about half a minute. When the first small gas bubbles appeared at the water surface, the pressure of the BP has been reached and the measurement was terminated.

Determination of the Gurley Number

The Gurley number was determined in the same apparatus as the BP. In the determination of the Gurley number, however, the time t which a gas volume of 100 ml required in order to flow through an area of 6.45 cm² (at a pressure of 31 cm water column of the gas) was determined. The time t is the Gurley number.

Flex Tolerance

The flex tolerance is determined by folding the separator to be investigated and placing on the resulting bend a weight having a mass of 1 kg and a circular base area of 10 cm diameter for one minute on the bend. The weight is positioned so that the weight is positioned with its diameter exactly on the bend. After the weight had been removed, the separator was unfolded, smoothed out and placed on a switched-on fluorescent screen. The bend was then assessed in the area which had been weighted with the weight, by using an optical microscope. Those areas of the bend in which the light of the fluorescent screen could pass unhindered through the separator and in which holes had thus been formed as a result of the bending were marked (for the blank sample, each separator can first be tested at the point to be bent by means of the fluorescent screen to ensure that no holes/defects are present prior to bending). The length of the bend marked in this manner was summed. If the marked length was less than 1 cm, the flex tolerance was rated as good. If the marked length was from 1 to 5 cm, the flex tolerance was rated as moderate. If the marked length was more than 5 cm (50%), the flex tolerance was rated as poor.

TABLE 3

Results of the characterization of the separators produced in the examples and in the comparative example.

| Separator according to | CON* MS/cm | MacMullin* | Thickness µm | BP bar | Coat g/m² | Gurleys | Flex tolerance |
|---|---|---|---|---|---|---|---|
| Comparison | 0.039 | 3.4 | 25 | 1.5 | 30 | 17 | Poor |
| Example 1 | 0.046 | 2.9 | 24 | 1.0 | 25 | 14 | Moderate |
| Example 2 | 0.044 | 3.1 | 25 | 1.0 | 20 | 32 | Moderate |
| Example 3 | 0.035 | 3.9 | 25 | 1.0 | 26 | 19 | Good |
| Example 4 | 0.034 | 3.9 | 26 | 1.0 | 27 | 22 | Good |
| Example 5 | 0.031 | 4.2 | 26 | 1.2 | 22 | 41 | Good |

*The samples were dried beforehand until they were free of water; a 0.01 molar solution of LiClO$_4$ in propylene carbonate serves as electrolyte.

The invention claimed is:

1. A separator which has, on a substrate and in voids of the substrate, which comprises fibers of an electrically nonconductive material, a porous electrically nonconductive ceramic coating comprising oxide particles which are adhesively bonded to one another and to the substrate by an inorganic adhesive and comprise at least one oxide selected from Al$_2$O$_3$, ZrO$_2$ and SiO$_2$, wherein organic polymer particles are also dispersed in the ceramic coating in addition to the oxide particles of Al$_2$O$_3$, ZrO$_2$ and/or SiO$_2$, wherein the organic polymer particles are particles of a polyolefin polymer or particles of a polyolefin copolymer.

2. The separator as claimed in claim 1, wherein the polymer particles have a melting point of more than 100° C.

3. The separator as claimed in claim 1, wherein, in the separator, a volume fraction of the oxide particles to the polymer particles is from 2:1 to 100:1.

4. The separator as claimed in claim 1, wherein the polymer particles have a mean particle size which corresponds to from 0.1 to 30 times the mean particle size of the oxide particles.

5. The separator as claimed in claim 4, wherein the polymer particles comprise particles having a mean particle size which is smaller than 0.5 times a thickness of the separator.

6. The separator as claimed in claim 1, wherein the substrate is a nonwoven polymer fabric which comprises polymer fibers selected from the group consisting of polyacrylonitrile, polyamide, polyester and polyolefin fibers.

7. The separator as claimed in claim 1, wherein the inorganic adhesive is at least one selected from the group consisting of oxides of the elements Al, Si and Zr.

8. The separator as claimed in claim 1, wherein the ceramic coating comprises at least one polymer film on an internal surface of the ceramic coating and an external surface of the ceramic coating.

9. The separator as claimed in claim 8, wherein the film has a thickness of from 10 nm to 5 µm.

10. The separator as claimed in claim 8, wherein the film has an open pore foam structure.

11. A method for the production of a separator as claimed in claim 1, wherein a substrate which comprises fibers of an electrically nonconductive material and voids between the fibers is provided with a ceramic coating, for which purpose a suspension is applied on and in the substrate and said suspension is solidified by heating at least once on or in the substrate, the suspension comprising a sol and at least two particle fractions suspended in the sol, the first fraction comprises at least one oxide particle selected from the group consisting of oxides of elements Al, Zr and Si and the second fraction of which comprises polymer particles.

12. The method as claimed in claim 11, wherein the proportion by volume of the particles of the oxide particle fraction used to the particles of the polymer particle fraction used is from 2:1 to 100:1.

13. The method as claimed in claim 11, wherein at least one oxide particle fraction whose particles have a mean particle size of from 0.1 to 10 µm is used.

14. The method as claimed in claim 11, wherein a polymer particle fraction whose particle has a mean particle size which corresponds to from 0.1 to 30 times the mean particle size of the suspended oxide particles is used.

15. The method as claimed in claim 11, wherein an adhesion promoter which is selected from organofunctional silanes is also added to the suspension prior to application to the substrate.

16. The method as claimed in claim 11, wherein the substrate used is a nonwoven polymer fabric which comprises fibers selected the group consisting of from a polyacrylonitrile, polyester, polyamide and polyolefin.

17. The method as claimed in claim 11, wherein the sol is obtained by hydrolyzing a precursor compound of at least one of the elements Al, Zr and Si with water or an acid diluted with water.

18. The method as claimed in claim 11, wherein the suspension present on and in the substrate is solidified by heating to 50 to 350° C.

19. The method as claimed in claim 11, wherein, after solidification of the suspension, the resulting ceramic coating is first treated with a solution of a polymer and the solvent is then removed.

20. A method for producing batteries comprising inserting a separator as claimed in claim 1 into the batteries.

21. A lithium battery comprising a separator as claimed in claim 1.

22. A vehicle comprising a lithium battery as claimed in claim 21.

23. The separator as claimed in claim 1, wherein the polymer particles are homogeneously dispersed in the ceramic coating.

24. The separator as claimed in claim 1, wherein the oxide particles, the inorganic adhesive and the polymer particles are a homogeneous mixture.

25. The separator as claimed in claim 1, wherein the organic polymer particles are particles of at least one polymer selected from the group consisting of PVDF, PP and PE.

26. The separator as claimed in claim 1, wherein the organic polymer particles and the oxide particles are homogeneously dispersed in the ceramic coating.

27. The separator as claimed in claim 1, wherein the organic polymer particles are particles of a polyolefin polymer.

28. The separator as claimed in claim 1, wherein the organic polymer particles are particles of a polyolefin copolymer and the oxide particles are particles of aluminum oxide.

29. The separator as claimed in claim 1, wherein the oxide particles are particles of aluminum oxide.

\* \* \* \* \*